(12) United States Patent
Higuchi

(10) Patent No.: US 10,425,311 B2
(45) Date of Patent: Sep. 24, 2019

(54) PACKET MONITORING APPARATUS, METHOD OF MONITORING PACKET AND NON-TRANSITORY COMPUTER-READABLE STORAGE MEDIUM

(71) Applicant: FUJITSU LIMITED, Kawasaki-shi, Kanagawa (JP)

(72) Inventor: Junichi Higuchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 47 days.

(21) Appl. No.: 15/407,754

(22) Filed: Jan. 17, 2017

(65) Prior Publication Data

US 2017/0264516 A1    Sep. 14, 2017

(30) Foreign Application Priority Data

Mar. 10, 2016 (JP) ................................. 2016-047525

(51) Int. Cl.
*H04L 29/06* (2006.01)
*H04L 12/26* (2006.01)

(52) U.S. Cl.
CPC .......... *H04L 43/087* (2013.01); *H04L 43/045* (2013.01); *H04L 43/0858* (2013.01); *H04L 65/602* (2013.01)

(58) Field of Classification Search
CPC .. H04L 43/087; H04L 65/602; H04L 43/0858
See application file for complete search history.

(56) References Cited

U.S. PATENT DOCUMENTS

| 2007/0223569 A1* | 9/2007 | Obata | G01R 31/31709 |
| | | | 375/228 |
| 2010/0074238 A1* | 3/2010 | Qian | H04L 41/0823 |
| | | | 370/338 |
| 2016/0112520 A1* | 4/2016 | Ganu | H04L 67/142 |
| | | | 709/223 |
| 2016/0344608 A1* | 11/2016 | Siemens | H04L 43/12 |

FOREIGN PATENT DOCUMENTS

JP        2007-158543        6/2007

* cited by examiner

*Primary Examiner* — Yemane Mesfin
*Assistant Examiner* — Henry Baron
(74) *Attorney, Agent, or Firm* — Staas & Halsey LLP

(57) ABSTRACT

A packet monitoring apparatus includes a memory and a processor configured to capture a plurality of packets transmitted through a communication line and belonging to a first session, specify capturing time intervals between the plurality of packets, acquire, from each of the plurality of packets, a clock number of clocks generated by a transmission apparatus and counted when each of the plurality of packets is transmitted from the transmission apparatus, specify a difference of the clock numbers between each of the plurality of packets and a packet captured immediately prior to each of the plurality of packets, specify a frequency of the clock based on the specified capturing time interval and the specified difference, and specify a jitter of the capturing time intervals based on the specified capturing time interval, the specified frequency, and the specified difference.

19 Claims, 17 Drawing Sheets

FIG. 2

| PAYLOAD TYPE | CLOCK FREQUENCY [Hz] | TYPE OF ENCODING |
|---|---|---|
| 0 | 8,000 | PCMU |
| 3 | 8,000 | GSM |
| 4 | 8,000 | G723 |
| 5 | 8,000 | DVI4 |
| 6 | 16,000 | DVI4 |
| 7 | 8,000 | LPC |
| 8 | 8,000 | PCMA |
| 9 | 8,000 | G722 |
| ⋮ | ⋮ | ⋮ |
| 34 | 90,000 | H263 |
| 35-71 | | unassigned |
| 72-76 | | reserved |
| 77-95 | | unassigned |
| 96-127 | | dynamic |

FIG. 6

| SESSION NUMBER | TRANSMISSION SOURCE IP ADDRESS | TRANSMISSION SOURCE PORT NUMBER | DESTINATION IP ADDRESS | DESTINATION PORT NUMBER | TIMESTAMP | ACQUISITION TIME POINT | PAYLOAD TYPE |
|---|---|---|---|---|---|---|---|
| 1 | 192.168.1.10 | 52186 | 192.168.1.11 | 5370 | 1600 | 09:00:13:324832 | 115 |
| 2 | 192.168.1.11 | 5370 | 192.168.1.10 | 52186 | 1760 | 09:00:13:655879 | 115 |
| 3 | 192.168.1.12 | 49372 | 192.168.1.13 | 5376 | 3200 | 09:00:13:655891 | 118 |
| 4 | 192.168.1.13 | 5376 | 192.168.1.12 | 49372 | 3200 | 09:00:13:705298 | 118 |
| ... | ... | ... | ... | ... | ... | ... | ... |

FIG. 9

| SESSION NUMBER | PAYLOAD TYPE | TIMESTAMP DIFFERENCE | ACQUISITION TIME POINT | ACQUISITION TIME INTERVAL ΔR [sec] |
|---|---|---|---|---|
| 1 | 115 | 160 | 09:00:13:245119 | 0.020311 |
| 1 | 115 | 160 | 09:00:13:264649 | 0.01953 |
| 1 | 115 | 160 | 09:00:13:284788 | 0.020139 |
| 1 | 115 | 160 | 09:00:13:306525 | 0.021737 |
| 1 | 115 | 160 | 09:00:13:324832 | 0.018307 |
| ⋮ | ⋮ | ⋮ | ⋮ | ⋮ |

FIG. 12

| SESSION NUMBER | PAYLOAD TYPE | ESTIMATION CLOCK FREQUENCY Cest [Hz] |
|---|---|---|
| 1 | 112 | 16000 |
| 1 | 114 | 16000 |
| 1 | 115 | 8000 |
| 1 | 116 | 8000 |
| 1 | 117 | 8000 |
| ⋮ | ⋮ | ⋮ |

| SESSION NUMBER | ACQUISITION TIME POINT | INSTANTANEOUS JITTER J [sec] | AVERAGE JITTER Jave [sec] |
|---|---|---|---|
| ⋮ | ⋮ | ⋮ | ⋮ |
| 1 | 09:00:13:245119 | 0.000311 | 0.000957 |
| 1 | 09:00:13:264649 | 0.000470 | 0.000927 |
| 1 | 09:00:13:284788 | 0.000139 | 0.000877 |
| 1 | 09:00:13:306525 | 0.001737 | 0.000931 |
| 1 | 09:00:13:324832 | 0.001693 | 0.000979 |
| ⋮ | ⋮ | ⋮ | ⋮ |

PACKET MONITORING APPARATUS, METHOD OF MONITORING PACKET AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2016-047525, filed on Mar. 10, 2016, the entire contents of which are incorporated herein by reference.

FIELD

The present technology relates to a packet monitoring apparatus, a method of monitoring packet, and a non-transitory computer-readable storage medium.

BACKGROUND

There is a technology that, in generation of a clock signal to be used for reproduction of audio data, a difference between an interval of a clock signal of a transmission apparatus and an interval of an acquisition time of clock information for synchronization is calculated. In the technology, a clock signal to be used for reproduction of audio data is generated at a frequency of a clock based on a value obtained by dividing the calculated difference by the interval of the synchronization clock information.

On the other hand, it is performed to acquire a packet transmitted through a communication line that couples terminals to each other and evaluate the quality of the communication line. Further, the quality of a communication line is degraded by an influence of an instantaneous jitter. Further, the instantaneous jitter may be calculated using a frequency of a clock signal used for transmission and reception of a packet (hereinafter referred to as "clock frequency"). It is to be noted that the quality of a communication line in the present specification signifies time-dependent stability of communication through the communication line. As a related art, there is Japanese Laid-open Patent Publication No. 2007-158543.

SUMMARY

According to an aspect of the embodiment, a packet monitoring apparatus configured to be coupled to a communication line between a transmission apparatus and a reception apparatus, the packet monitoring apparatus includes a memory and a processor coupled to the memory and configured to capture a plurality of packets transmitted through the communication line and belonging to a first session, specify capturing time intervals between the plurality of packets captured by the packet monitoring apparatus based on time points at which each of the plurality of packets is captured by the packet monitoring apparatus, acquire, from each of the plurality of packets, a clock number of clocks generated by the transmission apparatus and counted when each of the plurality of packets is transmitted from the transmission apparatus, specify a difference of the clock numbers between each of the plurality of packets and a packet captured immediately prior to each of the plurality of packets, specify a frequency of the clock based on the specified capturing time interval and the specified difference, and specify a jitter of the capturing time intervals based on the specified capturing time interval, the specified frequency, and the specified difference.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a view illustrating a clock frequency for each payload type of a real-time transport protocol (RTP);

FIG. 6 is a view illustrating an example of a session management table;

FIG. 9 is a view illustrating an example of packet interval data;

FIG. 12 is a view illustrating an example of a clock frequency table;

FIG. 15 is a view illustrating an example of jitter measurement data;

DESCRIPTION OF EMBODIMENT

A communication protocol such as an RTP includes a communication mode in which a clock frequency is not prescribed in advance. When the communication mode is used to perform communication, a clock frequency is determined, for example, through communication in advance between the transmission side and the reception side. However, in such a case that the communication in advance is performed using an encrypted form or the like, the clock frequency is unknown to some apparatus other than those at the transmission side and the reception side. Where the clock frequency is unknown, it is difficult to calculate jitters such as an instantaneous jitter and an average jitter that is calculated from the instantaneous jitter.

In the following, an example of an embodiment of the present technology is described in detail with reference to the drawings.

Figure 1:
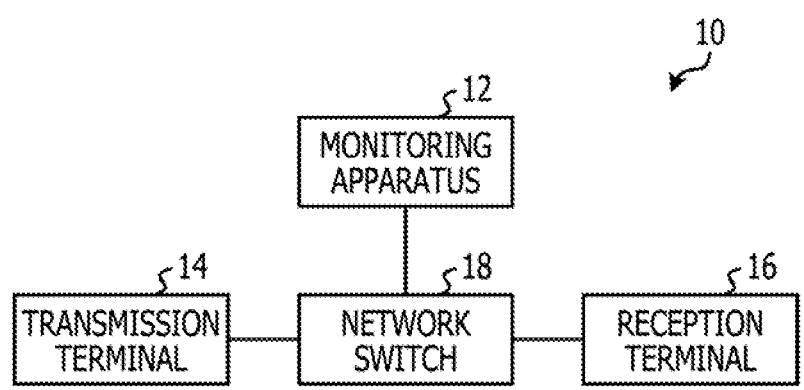
FIG. 1 is a block diagram depicting a schematic configuration of a communication system according to an embodiment.

As depicted in FIG. 1, a communication system 10 according to the present embodiment includes a packet monitoring apparatus 12 (hereinafter referred to as "monitoring apparatus 12"), a transmission terminal 14, a reception terminal 16, and a network switch 18. The monitoring apparatus 12, the transmission terminal 14, and the reception terminal 16 are individually coupled to the network switch 18 so as to be communicatable each other.

The network switch 18 mirrors a packet, which is transmitted through the communication line between the transmission terminal 14 and the reception terminal 16, to transfer the packet to the monitoring apparatus 12. The monitoring apparatus 12 acquires the packet transferred from the network switch 18 and calculates a jitter based on the acquired packet. It is to be noted that, in the present embodiment, a mode is described in which the RTP is applied as an example of the communication protocol with which a packet that is a calculation target of a jitter complies.

The RTP is a communication protocol that allows selective communication in a first communication mode in which a clock frequency for use for calculation of an instantaneous jitter is prescribed in advance and a second communication mode in which the clock frequency is not prescribed. As illustrated in FIG. 2, in the RTP, a plurality of payload types are prepared, and a clock frequency and a type of encoding are prescribed for each payload type. It is to be noted that a payload type is set to an RTP header in a packet of the RTP.

The transmission terminal 14 generates an RTP packet using a clock signal in accordance with a clock frequency and transmits the RTP packet to the reception terminal 16. The reception terminal 16 assembles a received RTP packet using a clock signal in accordance with the clock frequency.

For example, where the payload type is type 3, the clock frequency is prescribed so as to be 8,000 Hz in advance. Further, where the payload type is any of types 35 to 71 or 77 to 95, no clock frequency is allocated as yet, and where the payload type is any of types 72 to 76, it is preserved for future use and these payload types are not used at the present point of time. Further, where the payload type is any of types 96 to 127, no clock frequency is prescribed in advance (corresponding to the second communication mode), and a clock frequency is determined by communication performed in advance between a transmission terminal and a reception terminal prior to actual communication.

For example, the monitoring apparatus 12 fails to specify a clock frequency when the payload type of an acquired packet is one of types 96 to 127 and besides communication in advance between the transmission terminal 14 and the reception terminal 16 is performed in an encrypted form or the like. Therefore, the monitoring apparatus 12 in the present embodiment estimates a clock frequency and calculates a jitter with regard to a packet whose clock frequency is not prescribed as yet.

Figure 3:
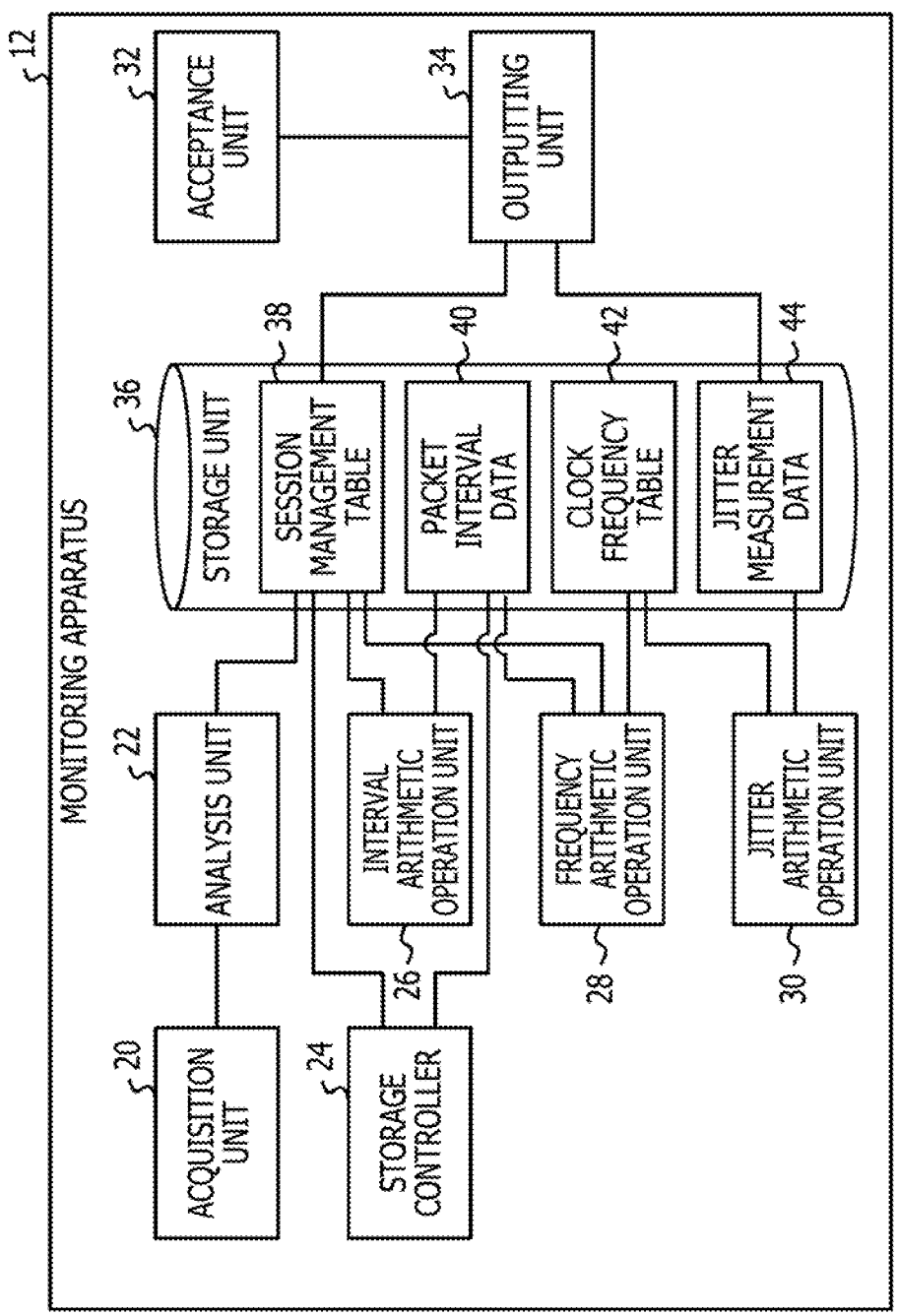
FIG. 3 is a functional block diagram of a packet monitoring apparatus according to an embodiment.

Now, a configuration of the monitoring apparatus 12 is described with reference to FIG. 3. As depicted in FIG. 3, the monitoring apparatus 12 includes an acquisition unit 20, an analysis unit 22, a storage controller 24, an interval arithmetic operation unit 26, a frequency arithmetic operation unit 28, a jitter arithmetic operation unit 30, an acceptance unit 32, an outputting unit 34, and a storage unit 36. The storage unit 36 stores a session management table 38, packet interval data 40, a clock frequency table 42, and jitter measurement data 44.

The acquisition unit 20 acquires a packet transmitted through the communication line from the network switch 18. The analysis unit 22 analyzes the packet acquired by the acquisition unit 20 to decide whether or not the packet is of the RTP. Further, the analysis unit 22 stores identification information for identifying a session of a packet of the RTP acquired by the acquisition unit 20 into the session management table 38 of the storage unit 36. In the present embodiment, the analysis unit 22 stores, as the identification information, a transmission source internet protocol (IP) address and a transmission source port number included in an IP header and the user datagram protocol (UDP) header of the packet of the RTP into the session management table 38 of the storage unit 36. Further, the analysis unit 22 stores also a destination IP address and a destination port number included in the IP header and the UDP header of the packet of the RTP into the session management table 38 of the storage unit 36.

Further, the analysis unit 22 stores a point of time at which a packet of the RTP is acquired by the acquisition unit 20 (such point of time is hereinafter referred to as "acquisition time point") and a timestamp and a payload type included in the RTP header of the packet of the RTP into the session management table 38 of the storage unit 36. It is to be noted that the timestamp included in a packet of the RTP is information obtained by counting the number of pulses of a clock signal and setting the clock count value at a timing for transmission of a packet to the packet by the transmission terminal 14. Further, the analysis unit 22 stores also a session number for uniquely identifying a session into the session management table 38 of the storage unit 36. The session management table 38 includes storage regions for a session number, a transmission source IP address, a transmission source port number, a destination IP address, a destination port number, a timestamp, an acquisition time point, and a payload type as illustrated in FIG. 6 as an example.

The storage controller 24 arithmetically operates an acquisition time interval after preceding acquisition of a particular packet of the same session acquired by the acquisition unit 20 and stores the acquisition time interval into the storage unit 36. In the present embodiment, the storage controller 24 performs the following processes based on identification information and a payload type included in a packet of the RTP acquired by the acquisition unit 20 and a record in the session management table 38 in which same identification information and payload type are stored. The storage controller 24 arithmetically operates, as the acquisition time interval after a particular packet is acquired in a preceding cycle, a difference between an acquisition time point of a particular packet in the present cycle and an acquisition time point stored in the record of the session management table 38.

Further, the storage controller 24 arithmetically operates a difference between the timestamp included in a packet acquired by the acquisition unit 20 and the timestamp of a record in the session management table 38 in which the same identification information and payload type are stored. It is to be noted that, in the following description, the difference between timestamps is referred to as "timestamp difference." It is to be noted that a timestamp is an example of a clock count value in the present technology. Then, the storage controller 24 stores the arithmetically operated acquisition time interval and timestamp difference into the packet interval data 40 of the storage unit 36. Further, the storage controller 24 stores also a session number, a payload type, and an acquisition time point corresponding to the acquisition time interval and the timestamp difference into the packet interval data 40 of the storage unit 36. The packet interval data 40 includes storage regions for a session number, a payload type, a timestamp difference, an acquisition time point, and an acquisition time interval as illustrated in FIG. 9 as an example.

The interval arithmetic operation unit 26 arithmetically operates, based on acquisition time interval between particular packets within a period within which the value representative of a dispersion of the acquisition time interval between a plurality of particular packets stored by the storage controller 24 is equal to or lower than a given value, an estimation value of a transmission time interval between particular packets. In the present embodiment, the interval arithmetic operation unit 26 arithmetically operates, based on a representative value of an acquisition time interval between particular packets within a period within which a standard deviation of the acquisition time interval between a plurality of particular packets stored by the storage controller 24 is equal to or smaller than a given value, an estimation value of a transmission time interval between particular packets.

It is to be noted that the interval arithmetic operation unit 26 may arithmetically operate, based on a representative value of an acquisition time interval between particular packets within a period within which a variance of the acquisition time interval between a plurality of particular packets stored by the storage controller 24 is equal to or smaller than a given value, an estimation value of a transmission time interval between particular packets. Alternatively, the interval arithmetic operation unit 26 may arithmetically operate, based on a representative value of an acquisition time interval between particular packets within a period within which the distribution of the acquisition time interval between a plurality of particular packets stored by the storage controller 24 is a normal distribution, an estimation value of a transmission time interval between particular packets.

The frequency arithmetic operation unit 28 arithmetically operates an estimation clock frequency from an estimation value of a transmission time interval between particular packets arithmetically operated by the interval arithmetic operation unit 26 and a difference between clock count values of particular packets. In the present embodiment, the frequency arithmetic operation unit 28 arithmetically operates an estimation clock frequency from the estimation value of a transmission time interval between particular packets arithmetically operated by the interval arithmetic operation unit 26 and the timestamp difference stored in the packet interval data 40. Then, the frequency arithmetic operation unit 28 stores the session number and payload type of the particular packets and the arithmetically operated estimation clock frequency into the clock frequency table 42 of the storage unit 36. The clock frequency table 42 includes storage regions for a session number, a payload type, and an estimation clock frequency as illustrated in FIG. 12 as an example.

The jitter arithmetic operation unit 30 arithmetically operates a jitter using an estimation clock frequency arithmetically operated by the frequency arithmetic operation unit 28. In the present embodiment, the jitter arithmetic operation unit 30 arithmetically operates, as jitters, an instantaneous jitter and an average jitter and stores the instantaneous jitter and the average jitter into the jitter measurement data 44 of the storage unit 36 together with a session number and an acquisition time point. The jitter measurement data 44 includes storage regions for a session number, an acquisition time point, an instantaneous jitter, and an average jitter as illustrated in FIG. 15 as an example.

The acceptance unit 32 accepts an outputting instruction of information relating to a jitter from a user. The outputting unit 34 outputs information based on a jitter arithmetically operated by the jitter arithmetic operation unit 30. In the present embodiment, when an outputting instruction is accepted by the acceptance unit 32, the outputting unit 34 reads out an average jitter from the jitter measurement data 44 and outputs the average jitter to the display apparatus.

Figure 4:
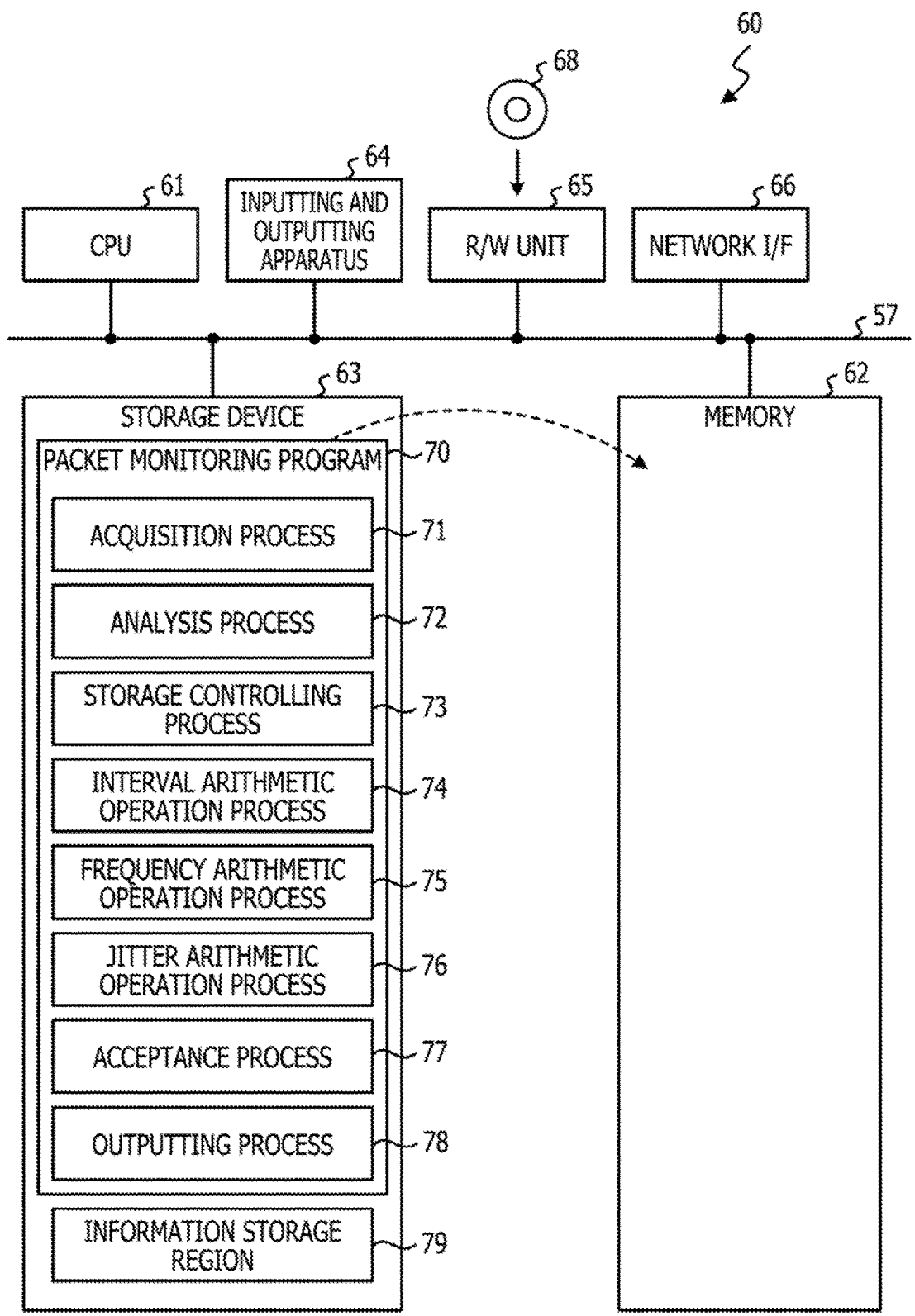
FIG. 4 is a block diagram depicting a schematic configuration of a computer that functions as a packet monitoring apparatus according to an embodiment.

The monitoring apparatus 12 may be implemented, for example, by a computer 60 depicted in FIG. 4. The computer 60 includes a central processing unit (CPU) 61, a memory 62 serving as a temporary storage region, and a nonvolatile storage unit 63. The computer 60 further includes an inputting and outputting apparatus 64 including an inputting unit, a display unit and so forth, a reading/writing (R/W) unit 65 for controlling reading and writing of data from and into a recording medium 68, and a network interface (I/F) 66 coupled to a network. The CPU 61, the memory 62, the storage unit 63, the inputting and outputting apparatus 64, the R/W unit 65, and the network I/F 66 are coupled to each other by a bus 67.

The storage unit 63 may be implemented using a hard disk drive (HDD), a solid state drive (SSD), a flash memory or the like. In the storage unit 63 as a storage medium, a packet monitoring program 70 for causing the computer 60 to function as the monitoring apparatus 12 is stored. The packet monitoring program 70 includes an acquisition process 71, an analysis process 72, a storage controlling process 73, an interval arithmetic operation process 74, a frequency arithmetic operation process 75, a jitter arithmetic operation process 76, an acceptance process 77, and an outputting process 78.

The CPU 61 reads out the packet monitoring program 70 from the storage unit 63 and deploys the packet monitoring program 70 into the memory 62 and executes the processes the packet monitoring program 70 has. The CPU 61 operates as the acquisition unit 20 depicted in FIG. 3 by executing the acquisition process 71. The CPU 61 operates as the analysis unit 22 depicted in FIG. 3 by executing the analysis process 72. The CPU 61 operates as the storage controller 24 depicted in FIG. 3 by executing the storage controlling process 73. The CPU 61 operates as the interval arithmetic operation unit 26 depicted in FIG. 3 by executing the interval arithmetic operation process 74. The CPU 61 operates as the frequency arithmetic operation unit 28 depicted in FIG. 3 by executing the frequency arithmetic operation process 75. The CPU 61 operates as the jitter arithmetic operation unit 30 depicted in FIG. 3 by executing the jitter arithmetic operation process 76. The CPU 61 operates as the acceptance unit 32 depicted in FIG. 3 by executing the acceptance process 77. The CPU 61 operates as the outputting unit 34 depicted in FIG. 3 by executing the outputting process 78. Consequently, the computer 60 executing the packet monitoring program 70 functions as the monitoring apparatus 12. Further, the storage unit 63 includes an information storage region 79 that functions as the storage unit 36.

Also it is possible to implement the functions implemented by the packet monitoring program 70 using, for example, a semiconductor integrated circuit, for more detail, an application specific integrated circuit (ASIC) or the like.

Now, action of the packet monitoring apparatus 12 according to the present embodiment is described. The packet monitoring apparatus 12 executes the packet monitoring process illustrated in FIG. 5 by the CPU 61 executing the packet monitoring program 70.

Figure 5:
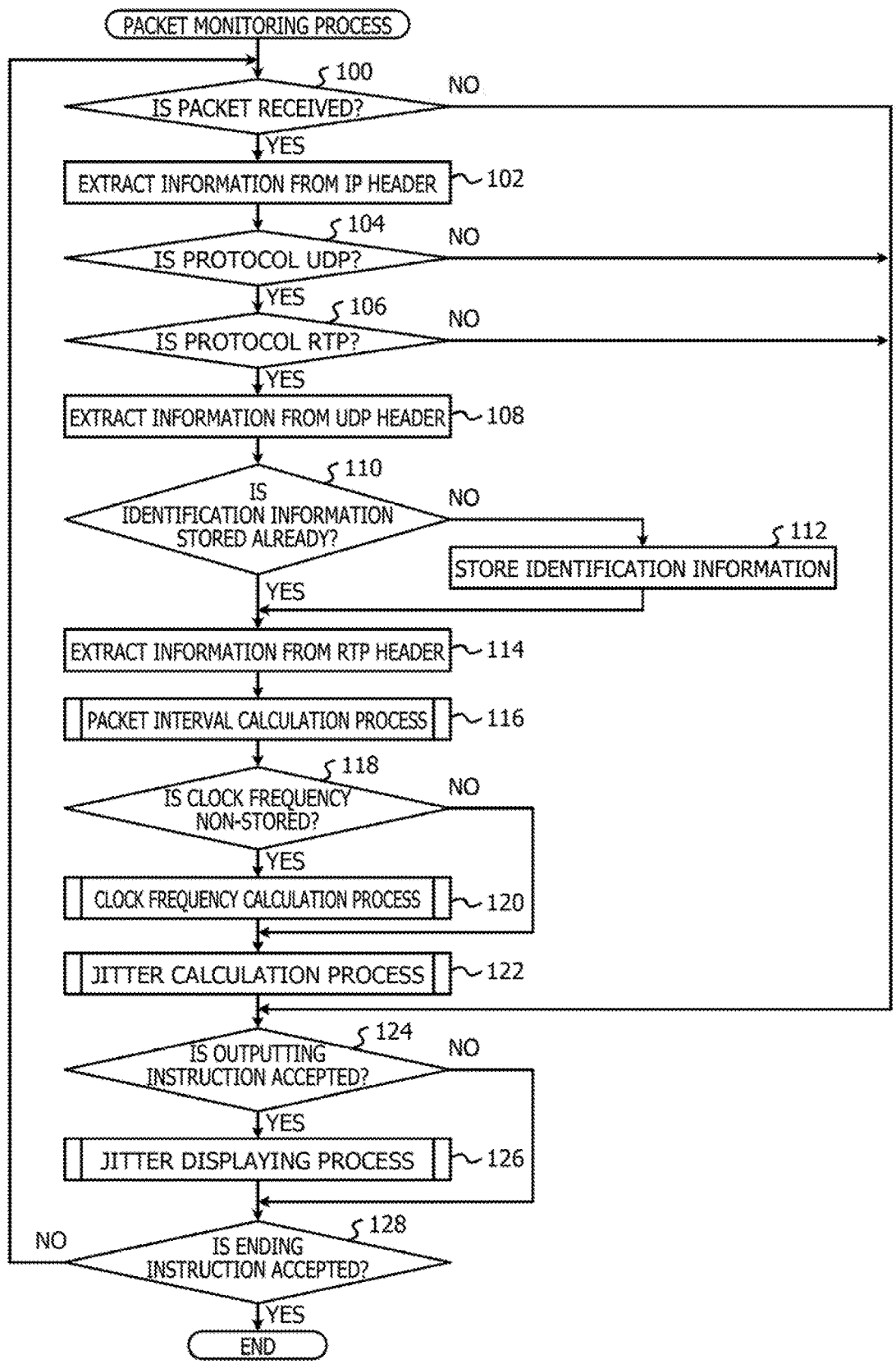
FIG. 5 is a flow chart illustrating an example of a packet monitoring process according to an embodiment.

At step 100 of the packet monitoring process illustrated in FIG. 5, the acquisition unit 20 decides whether or not a packet is received from the network switch 18. If a packet is received from the network switch 18, the decision at step 100 becomes affirmative and the acquisition unit 20 acquires the packet received from the network switch 18, whereafter the processing advances to step 102. If the decision at step 100 is negative, the processing advances to step 124. At step 102, the analysis unit 22 extracts a transmission source IP address, a destination IP address, and a protocol number from the IP header of the packet acquired at step 100 (hereinafter referred to as "processing target packet").

At next step 104, the analysis unit 22 decides based on the protocol number extracted at step 102 whether or not the processing target packet is a packet having been communicated by the UDP. If the decision is negative, the processing advances to step 124. If the decision is affirmative, the processing advances to step 106.

At step 106, the analysis unit 22 decides whether or not the processing target packet is a packet of the RTP by deciding whether or not the format of the header of the processing target packet complies with the RTP. If the decision is negative, the processing advances to step 124. If the decision is affirmative, the processing advances to step 108.

At step 108, the analysis unit 22 extracts the transmission source port number and the destination port number from the UDP header of the processing target packet. The transmission source IP address and the destination IP address extracted at step 102 and the transmission source port number and the destination port number extracted at step 108 are an example of identification information of the present technology.

At next step 110, the analysis unit 22 decides whether or not a record or records that store identification information same as the identification information extracted at step 102 and step 108 exist in the session management table 38. If the decision is negative, the processing advances to step 112. If the decision is affirmative, the processing advances to step 114. It is to be noted that, in the following description, a record of the session management table 38 in which identification information same as the identification information of the processing target packet is stored is referred to as record of the same session.

At step 112, the analysis unit 22 stores a session number for uniquely identifying the identification information acquired at step 102 and step 108 and the identification information into the session management table 38 of the storage unit 36. When a particular packet is received for the first time, for each piece of the identification information, a session number and the piece of identification information are stored into the session management table 38 as illustrated in FIG. 6 as an example. It is to be noted that a timestamp, an acquisition time point, and a payload type of the session management table 38 are hereinafter described.

At step 114, the analysis unit 22 extracts a payload type and a timestamp from the RTP header of the processing target packet. At next step 116, a packet interval calculation process illustrated in FIG. 7 is executed.

Figure 7:
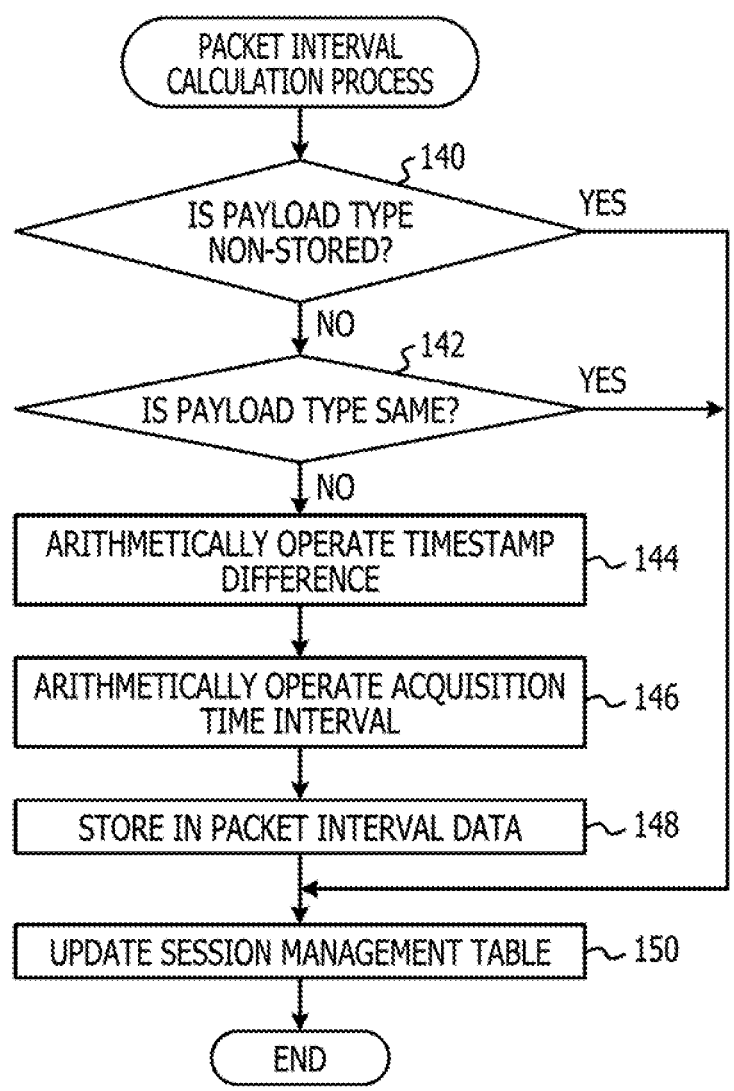
FIG. 7 is a flow chart illustrating an example of a packet interval calculation process according to an embodiment.

At step 140 of the packet interval calculation process depicted in FIG. 7, the storage controller 24 decides whether or not a payload type is non-stored in a record of a session same as that of the processing target packet in the session management table 38. If the decision is affirmative, the processing advances to step 150. If the decision is negative, the processing advances to step 142.

At step 142, the storage controller 24 decides whether or not the payload type of the processing target packet and the payload type stored in the record of the session same as that of the processing target packet in the session management table 38 are same as each other. If the decision is negative, the processing advances to step 150. If the decision is affirmative, the processing advances to step 144.

At step 144, the storage controller 24 arithmetically operates a timestamp difference $\Delta T$ in accordance with the following expression (1). In expression (1), $T_i$ is the timestamp of the processing target packet, and $T_{i-1}$ is a timestamp stored in a record of a session same as that of the processing target packet in the session management table 38. Further, the suffix i represents an acquisition timing of the packet and is a natural number.

$$\Delta T = T_i - T_{i-1} \quad (1)$$

At next step 146, the storage controller 24 arithmetically operates an acquisition time interval $\Delta R$ in accordance with the following expression (2). In expression (2), $R_i$ is an acquisition time point of the processing target packet, and $R_{i-1}$ is an acquisition time point stored in a record of a session same as that of the processing target packet in the session management table 38.

$$\Delta R = R_i - R_{i-1} \quad (2)$$

Figure 8:
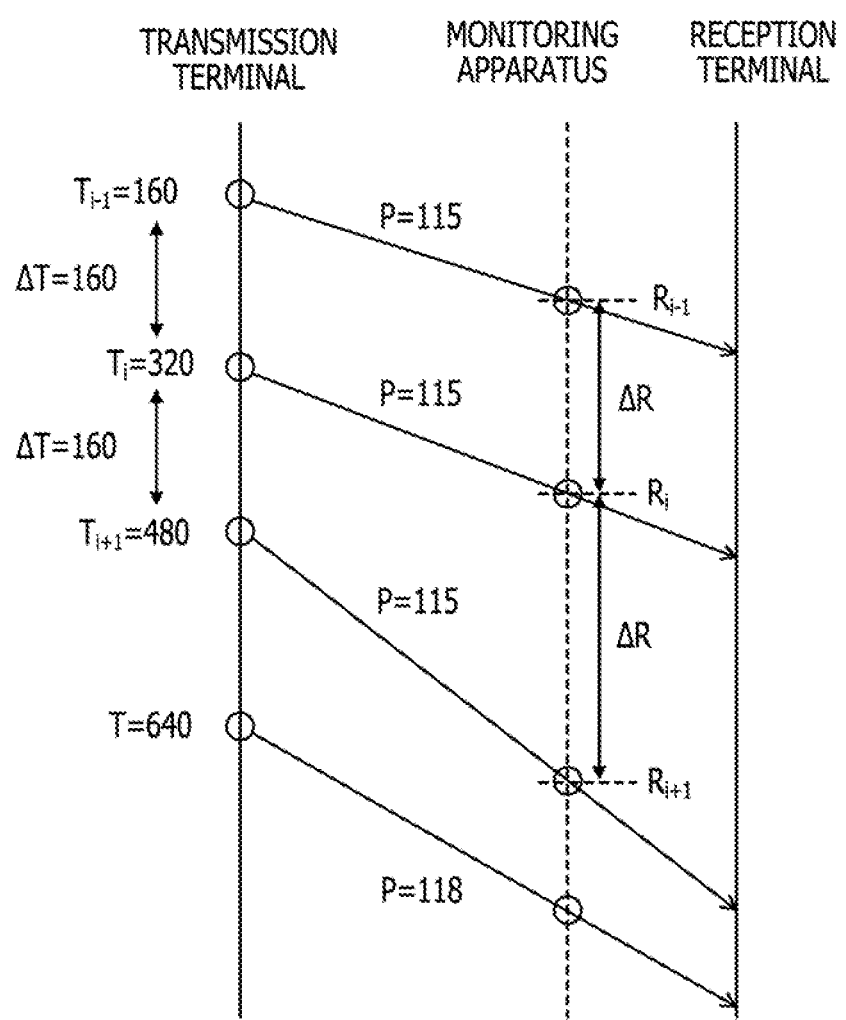
FIG. 8 is a view illustrating a timestamp difference and an acquisition time interval.

At step 144 and step 146 described above, the timestamp difference $\Delta T$ and the acquisition time interval $\Delta R$ are arithmetically operated for particular packets of the same session and the same payload type as illustrated in FIG. 8 as an example. It is to be noted that FIG. 8 illustrates a case in which the payload type of a packet of the RTP is 115 as an example.

At next step 148, the storage controller 24 stores the timestamp difference $\Delta T$ arithmetically operated at step 144 and the acquisition time interval $\Delta R$ arithmetically operated at step 146 into the packet interval data 40 of the storage unit 36. Along with this, the storage controller 24 stores also the session number, the payload type, and the acquisition time point into the same record of the packet interval data 40 of the storage unit 36. In the present embodiment, every time a particular packet is received, a session number, a payload type, a timestamp difference $\Delta T$, an acquisition time point, and an acquisition time interval $\Delta R$ are stored additionally to the packet interval data 40 as illustrated in FIG. 9 as an example.

At step 150, the analysis unit 22 updates the acquisition time point from within the record of the session same as that of the processing target packet in the session management table 38 to the acquisition time point of the processing target packet (refer also to FIG. 6). Further, the analysis unit 22 updates the timestamp and the payload type from within the record of the session same as that of the processing target packet in the session management table 38 to the timestamp and the payload type acquired at step 114 (refer also to FIG. 6). When the processing at step S150 comes to an end, the packet interval calculation process is ended, and the processing advances to step 118 of FIG. 5.

At step 118, the analysis unit 22 decides whether or not a record that has a session number same as that of the processing target packet and has the same payload type stored therein exists in the clock frequency table 42. If the decision is negative, the processing advances to step 122. If the decision is affirmative, the processing advances to step 120. At next step 120, a clock frequency calculation process illustrated in FIG. 10 is executed.

Figure 10:
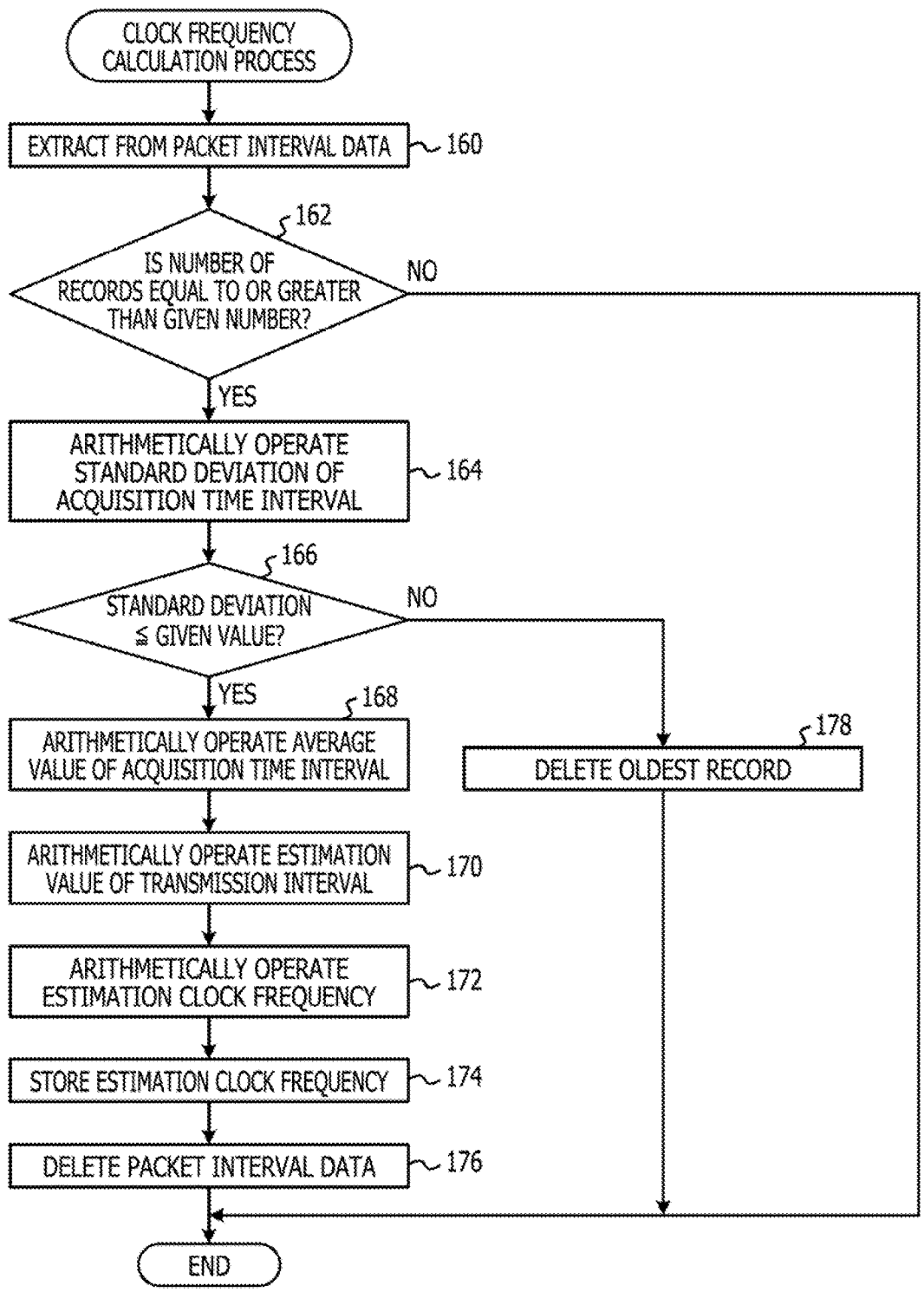
FIG. 10 is a flow chart illustrating an example of a clock frequency calculation process according to an embodiment.

At step 160 of the clock frequency calculation process illustrated in FIG. 10, the interval arithmetic operation unit 26 extracts, from within the packet interval data 40, records in which a session number same as that of the processing target packet is stored. At step 162, the interval arithmetic operation unit 26 decides whether or not the number of the records extracted at step 160 is equal to or greater than a given number (for example, 100). If the decision is affirmative, the processing advances to step 164. It is to be noted that, as the given number in this case, a value determined in response to requested calculation accuracy for a jitter and so forth may be applied.

At step 164, the interval arithmetic operation unit 26 arithmetically operates a standard deviation of the acquisition time interval in the records acquired at step 160. At step 166, the interval arithmetic operation unit 26 decides whether or not the standard deviation arithmetically operated at step 164 is equal to or smaller than a given value. If the decision is negative, the processing advances to step 178. If the decision is affirmative, the processing advances to step 168. It is to be noted that, as the given value in this case, a value determined in response to requested calculation accuracy for a jitter or the like may be applied.

It is to be noted that the data group of the acquisition time interval acquired at step 160 may be divided into a plurality of groups each including the number of data equal to or greater than a given number such that data acquired at points of time proximate to each other may belong to a same group. Further, a standard deviation may be arithmetically operated for each group to select a group having a standard deviation equal to or smaller than a given value, and the processing at steps beginning with the next step 168 may be performed using data of the selected group.

At step 168, the interval arithmetic operation unit 26 arithmetically operates an average value as a representative value of the acquisition time interval in the records extracted at step 160. It is to be noted that the interval arithmetic operation unit 26 may arithmetically operates another representative value such as a median or a mode value of the acquisition time interval in place of an average value of the acquisition time interval.

Figure 11:
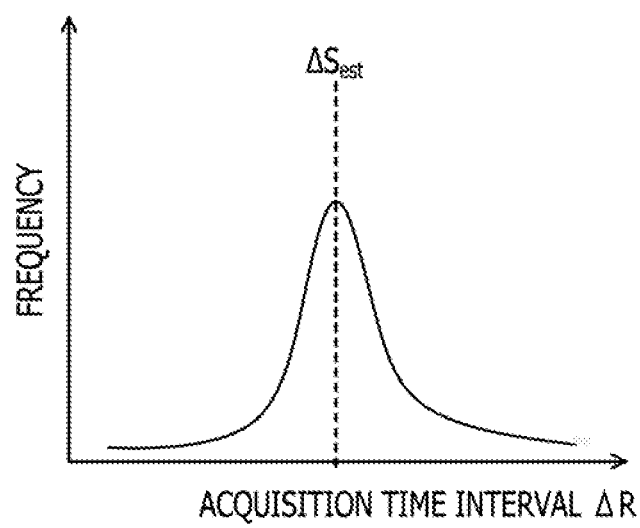
FIG. 11 is a graph illustrating an estimation value of a transmission interval.

At next step 170, the interval arithmetic operation unit 26 arithmetically operates an estimation value of a transmission interval by arithmetically operating a value that is a multiple of a given calculation unit time period and is most approximate to the average value of the acquisition time interval arithmetically operated at step 168. For example, if the average value of the acquisition time interval is 0.019897 [sec] and the calculation unit time period is 0.01 [sec], the interval arithmetic operation unit 26 arithmetically operates the estimation value of the transmission interval as 0.02 [sec]. In this manner, in the present embodiment, an estimation value $\Delta S_{est}$ of the transmission interval is arithmetically operated from the representative value of the acquisition time interval within a period within which the value representative of a dispersion of the acquisition time interval $\Delta R$ is equal to or lower than a given value as illustrated in FIG. 11. It is to be noted that, as the calculation unit time period in this case, a value designated by a user or the like may be applied.

At next step 172, the frequency arithmetic operation unit 28 arithmetically operates an estimation clock frequency $C_{est}$ in accordance with the following expression (3). In expression (3), $\Delta T$ is a timestamp difference between the records acquired at step 160, and $\Delta S_{est}$ is an estimation value of the transmission interval arithmetically operated at step 170.

$$C_{est}=\Delta T/\Delta S_{est} \quad (3)$$

At next step 174, the frequency arithmetic operation unit 28 stores the estimation clock frequency $C_{est}$ arithmetically operated at step 172 into the clock frequency table 42 of the storage unit 36 together with the session number and the payload type. The estimation clock frequency $C_{est}$ is stored for each combination of a session number and a payload type into the clock frequency table 42 as illustrated in FIG. 12 as an example.

At next step 176, the frequency arithmetic operation unit 28 deletes a record that has a session number same as that of the processing target packet in the packet interval data 40 and has the same payload type as that of the processing target packet stored therein in the packet interval data 40. When the processing at step 176 comes to an end, the clock frequency calculation process is ended. On the other hand, at step 178, the interval arithmetic operation unit 26 deletes, from among the records that have a session number same as that of the processing target packet in the packet interval data 40 and have a payload type same as that of the processing target packet stored therein in the packet interval data 40, the record having the oldest acquisition time point. When the processing at step 178 comes to an end, the clock frequency calculation process is ended. On the other hand, if the decision at step 162 is negative, the clock frequency calculation process is ended. After the clock frequency calculation process comes to an end, the processing returns to step 122 of FIG. 5. At step 122, a jitter calculation process illustrated in FIG. 13 is executed.

Figure 13:
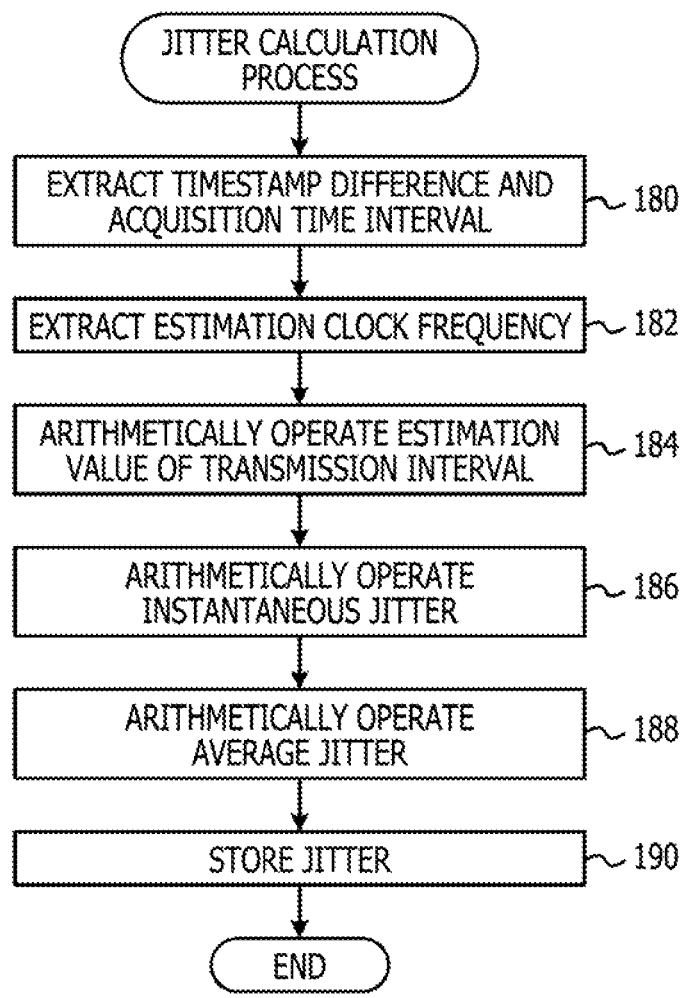
FIG. 13 is a flow chart illustrating an example of a jitter calculation process according to an embodiment.

At step 180 of the jitter calculation process illustrated in FIG. 13, the jitter arithmetic operation unit 30 extracts, from within the packet interval data 40, a timestamp difference $\Delta T$ and an acquisition time interval $\Delta R$ stored in a record having a session number and a payload type same as those of the processing target packet. At next step 182, the jitter arithmetic operation unit 30 extracts, from within the clock frequency table 42, an estimation clock frequency $C_{est}$ stored in a record in which a session number and a payload type are same as those of the processing target packet. At next step 184, the jitter arithmetic operation unit 30 arithmetically operates an estimation value $\Delta S_{est}$ of the transmission interval in accordance with the following expression (4). In expression (4), $\Delta T$ is the timestamp difference extracted at step 180, and $C_{est}$ is the estimation clock frequency extracted at step 182.

$$\Delta S_{est}=\Delta T/C_{est} \quad (4)$$

At next step 186, the jitter arithmetic operation unit 30 arithmetically operates an instantaneous jitter J in accordance with the following expression (5). In expression (5), $\Delta R$ is the acquisition time interval extracted at step 180, and $\Delta S_{est}$ is the estimation value of the transmission interval arithmetically operated at step 184.

$$J=|\Delta R-\Delta S_{est}| \quad (5)$$

Figure 14:
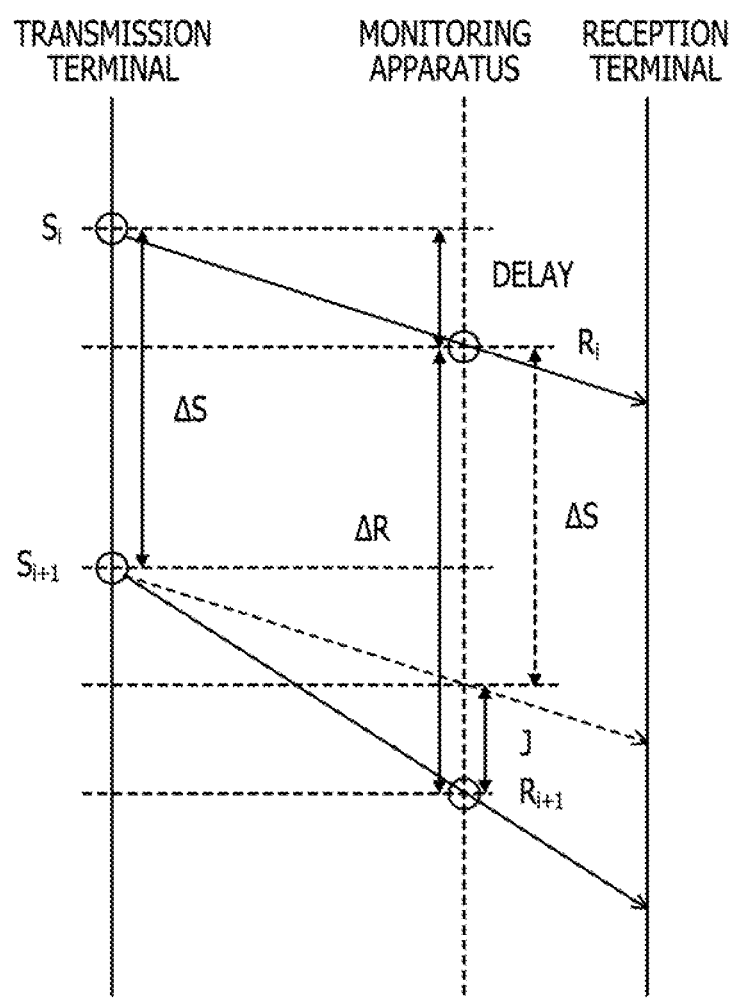
FIG. 14 is a view illustrating an instantaneous jitter.

As apparent from expression (5), the instantaneous jitter J is an absolute value of the difference between the transmission interval $\Delta S$ and the acquisition time interval $\Delta R$ between the packets, and represents a dispersion in delay in transmission for each packet as illustrated in FIG. 14 as an example and is used as an index to the quality of a communication line.

At next step 188, the jitter arithmetic operation unit 30 arithmetically operates an average jitter $J_{ave}$ in accordance with the following expression (6). In expression (6), $J_{ave}$ is the average jitter of the jitter measurement data 44 having been stored into the storage unit 36 at step 190 hereinafter described in a preceding operation cycle, and J is the instantaneous jitter arithmetically operated at step 186. It is to be noted that, when the processing at step 188 is executed for the first time, the jitter arithmetic operation unit 30 may set, for example, the average jitter $J_{ave}$ to a value substantially equal to the value of the instantaneous jitter J. Further, in the present embodiment, since the arithmetic operation of the average jitter $J_{ave}$ uses the technique disclosed in request for comments (RFC) 3550, detailed description is omitted herein.

$$J_{ave}=(1-\alpha)J_{ave}+\alpha j \qquad (6)$$

In this regard, $\alpha$ is equal to $\frac{1}{16}$.

At next step 190, the jitter arithmetic operation unit 30 stores the instantaneous jitter J arithmetically operated at step 186 and the average jitter $J_{ave}$ arithmetically operated at step 188 into the jitter measurement data 44 of the storage unit 36 together with the session number and the acquisition time point of the processing target packet. As illustrated in FIG. 15 as an example, every time an instantaneous jitter J and an average jitter $J_{ave}$ are arithmetically operated, a session number, an acquisition time point, an instantaneous jitter J, and an average jitter $J_{ave}$ are stored into the jitter measurement data 44. After the processing at step 190 comes to an end, the jitter calculation process is ended, and the processing returns to step 124 of FIG. 5.

For example, when a user of the monitoring apparatus 12 (a network manager as an example) wants to confirm jitter information, the user would issue an instruction to output jitter information through the inputting unit of the inputting and outputting apparatus 64 of the monitoring apparatus 12. Thus, at step 124, the acceptance unit 32 decides whether or not an outputting instruction of jitter information is accepted. If the decision is negative, the processing advances to step 128. If the decision is affirmative, the processing advances to step 126. At step 126, a jitter displaying process illustrated in FIG. 16 is executed.

Figure 16:
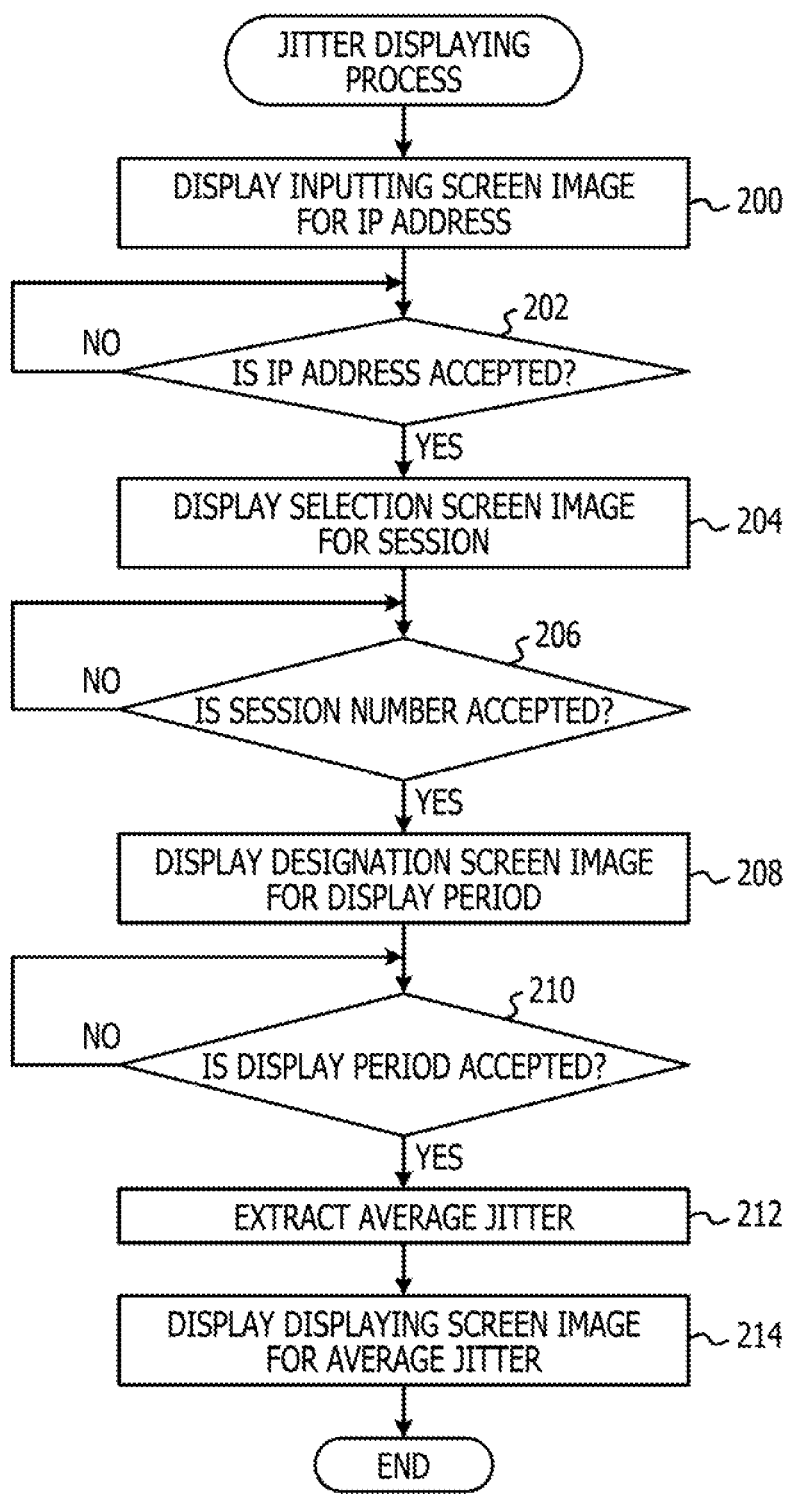
FIG. 16 is a flow chart illustrating an example of a jitter displaying process according to an embodiment.

At step 200 of the jitter displaying process illustrated in FIG. 16, the outputting unit 34 outputs information indicative of an inputting screen image for IP address for allowing the user to input a transmission source IP address and a destination IP address that are a displaying target of jitter information to the display unit of the inputting and outputting apparatus 64. The display unit displays an inputting screen image for IP address when the information indicative of the inputting screen image for IP address is inputted. When the inputting screen image for IP address is displayed on the display unit, the user would input a transmission source IP address and a destination IP address through the inputting unit of the inputting and outputting apparatus 64.

At step 202, the acceptance unit 32 performs waiting for acceptance of a transmission source IP address and a destination IP address. If the acceptance unit 32 accepts a transmission source IP address and a destination IP address, the decision at step 202 becomes affirmative, and the processing advances to step 204. At step 204, the outputting unit 34 extracts, from within the session management table 38, a record in which the transmission source IP address and the destination IP address are same as the transmission source IP address and the destination IP address accepted at step 202. Then, the outputting unit 34 outputs information indicative of a selection screen image for session for allowing the user to select a session of a displaying target of jitter information from within the extracted record to the display unit of the inputting and outputting apparatus 64.

When the information indicative of the selection screen image for session is inputted, the display unit displays a selection screen image for session. When the selection screen image for session is displayed on the display unit, the user would select a session number of a displaying target of jitter information through the inputting unit of the inputting and outputting apparatus 64.

At step 206, the acceptance unit 32 performs waiting for acceptance of a session number. If the acceptance unit 32 accepts a session number, the decision at step 206 becomes affirmative, and the processing advances to step 208. At step 208, the outputting unit 34 outputs information indicative of a designation screen image for display period for allowing the user to designate a period of time of a displaying target of jitter information to the display unit of the inputting and outputting apparatus 64.

When the information indicative of the designation screen image for display period is inputted, the display unit displays a designation screen image for display period. When the designation screen image for display period is displayed on the display unit, the user would input a starting time point and an ending time point of a period of a displaying target of jitter information through the inputting unit of the inputting and outputting apparatus 64.

At step 210, the acceptance unit 32 performs waiting for acceptance of a starting time point and an ending time point. If the acceptance unit 32 accepts a starting time point and an ending time point, the decision at step 210 becomes affirmative, and the processing advances to step 212. At step 212, the outputting unit 34 extracts, from within the jitter measurement data 44, an average jitter for each of unit time periods that have a session number same as that accepted at step S206 and have an acquisition time point between the starting time point and the ending time point accepted at step 210.

Figure 17:
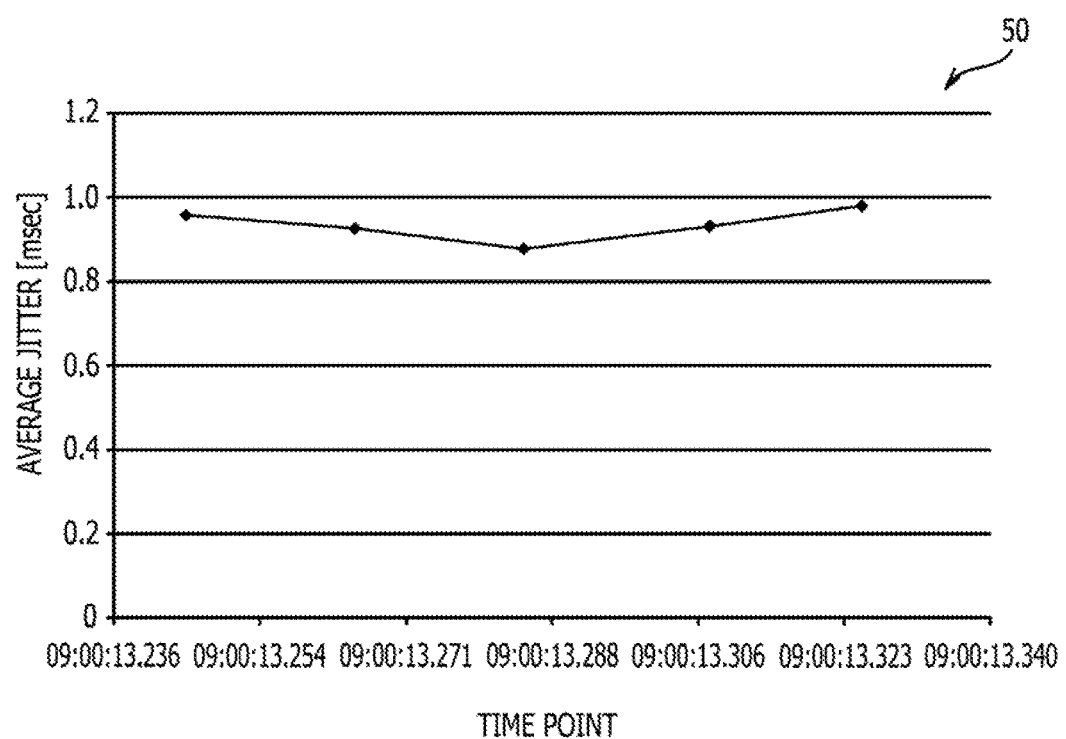
FIG. 17 is a view depicting an example of an average jitter displaying screen image.

At next step 214, the outputting unit 34 outputs information indicative of a displaying screen image for average jitter that displays the average jitters extracted at step 212 in the form of a graph of the time series to the display unit of the inputting and outputting apparatus 64. When the information indicative of a displaying screen image for average jitter is inputted, the display unit displays an average jitter displaying screen image 50 as depicted in FIG. 17 as an example. As depicted in FIG. 17, on the average jitter displaying screen image 50 according to the present embodiment, an average jitter is displayed in the form of a graph of the time series. The user would check the values or a dispersion of jitters displayed on the average jitter displaying screen image 50 to evaluate the quality of the communication line. The evaluation here includes, for example, an evaluation for deciding whether or not jitters within a period within which the standard deviation of the acquisition time interval between packets exceeds a given value remain within a permissible range.

After the processing at step S214 comes to an end, the jitter displaying process is ended, and the processing returns to step 128 of FIG. 5. At step 128, the acceptance unit 32 decides whether or not an ending instruction of the processing is accepted. If the decision is negative, the processing returns to step 100. If the decision is affirmative, the packet monitoring process is ended.

As described above, with the present embodiment, an estimation value of a transmission time interval between particular packets is arithmetically operated based on an acquisition time interval between particular packets within a period within which a value indicative of a dispersion of the acquisition time interval between a plurality of stored particular packets of a same session is equal to or lower than a given value. Further, an estimation clock frequency is arithmetically operated from the arithmetically operated estimation value of the transmission time interval between particular packets and a difference between clock count values upon transmission of particular packets corresponding to the transmission time interval between particular packets. Further, a jitter is calculated from the arithmetically operated estimation clock frequency. Consequently, a jitter may be calculated also where the clock frequency is unknown.

Further, with the present embodiment, the arithmetically operated jitter is outputted to a display unit. Consequently, the user may easily comprehend the quality of the communication line.

Further, with the present embodiment, an estimation value of the transmission time interval between particular packets is arithmetically operated based on the acquisition time interval between particular packets within a period within which a standard deviation of the acquisition time interval between a plurality of stored particular packets of the same session is equal to or lower than a given value. Consequently, the estimation value of the transmission time interval may be arithmetically operated with high accuracy.

Further, with the present embodiment, an estimation value of the transmission time interval between particular packets is arithmetically operated based on a representative value (in the present embodiment, an average value) of the acquisition time interval between particular packets within a period within which a value indicative of a dispersion of the acquisition time interval between a plurality of stored particular packets is equal to or lower than a given value. Consequently, the estimation value of the transmission time interval may be arithmetically operated with high accuracy.

It is to be noted that, in the embodiment described above, as regards a packet of a payload type for which a clock frequency is prescribed in advance, an instantaneous jitter and an average jitter may be arithmetically operated similarly as in the embodiment described above using the clock frequency corresponding to the payload type.

Further, while the embodiment described above is directed to a case in which the RTP is applied as a communication protocol that is an arithmetic operation target of a jitter, the present technology is not limited to this. For example, as a communication protocol that is an arithmetic operation target of a jitter, another communication protocol other than the RTP may be applied according to which no clock frequency is prescribed as yet and a clock count value similar to a timestamp of the RTP is included in a packet. Further, in this mode, where the communication protocol itself is a protocol in which a clock frequency is not prescribed as yet, another mode may be applied in which an estimation clock frequency is arithmetically operated for each piece of identification information without taking the payload type into consideration.

Further, while the embodiment described above is directed to a case in which an average jitter is displayed on the display unit, the present technology is not limited to this. For example, a mode in which an instantaneous jitter is displayed on the display unit or another mode in which both of an average jitter and an instantaneous jitter are displayed on the display unit may be applied.

Further, for example, when at least one of an instantaneous jitter and average jitter that are arithmetically operated is equal to or higher than a given value, an alarm may be outputted. In this case, a mode in which an alarming screen image is displayed on the display unit or another mode in which alarming sound is reproduced from a sound reproduction apparatus such as a speaker is exemplified.

Further, although the embodiment described above is directed to a case in which an estimation value of the transmission interval is arithmetically operated by arithmetically operating a value that is a multiple of a given calculation unit and is most proximate to an average value of the acquisition time interval, the present technology is not limited to this. The estimation clock frequency may be arithmetically operated otherwise by using an average value of the acquisition time interval as an estimation value of the transmission interval, arithmetically operating a clock frequency in accordance with expression (3) given hereinabove, and arithmetically operating a value most proximate to a multiple of a given calculation unit of the arithmetically operated clock frequency. In the case of the mode example, for example, where the arithmetically operated clock frequency is 8041 [Hz] and the calculation unit is 100 [Hz], the estimation clock frequency is arithmetically operated as 8000 [Hz].

Further, while the embodiment described hereinabove is directed to a case in which an average jitter is outputted to the display unit of the inputting and outputting apparatus 64 of the monitoring apparatus 12, the present technology is not limited to this. For example, an average jitter may be outputted to an external apparatus coupled to the monitoring apparatus 12 through a communication line.

Further, while the embodiment described hereinabove is directed to a mode in which the packet monitoring program 70 is stored (installed) in advance in the storage unit 63, the present technology is not limited to this. Also it is possible to provide the packet monitoring program 70 in such a form that it is recorded in a recording medium such as a compact disc read-only memory (CD-ROM), a digital versatile disc (DVD)-ROM, or a universal serial bus (USB) memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A packet monitoring apparatus configured to be coupled to a communication line between a transmission apparatus and a reception apparatus, the packet monitoring apparatus comprising:
   a memory; and
   a processor coupled to the memory and configured to:
      capture a plurality of packets transmitted through the communication line and belonging to a first session,
      specify capturing time intervals between the plurality of packets captured by the packet monitoring apparatus based on time points at which each of the plurality of packets is captured by the packet monitoring apparatus,
      acquire, from each of the plurality of packets, a clock number of clocks generated by the transmission apparatus and counted when each of the plurality of packets is transmitted from the transmission apparatus,
      specify a difference of the clock numbers between each of the plurality of packets and a packet captured immediately prior to the each of the plurality of packets, specify, based on a statistic of the capturing time intervals, a transmitting time interval at which each of the plurality of packets is transmitted from the transmission apparatus, calculate a frequency of the clock by dividing the specified difference with the specified transmitting time interval, specify a jitter of the capturing time intervals based on the specified capturing time interval, the calculated frequency, and the specified difference, receive an output instruction for instructing an output of the specified jitter from a user, request designating a period of time of a display target of the specified jitter in response to the output instruction, extract, when the period of time is input by the user, an average jitter for each of unit time periods within the period of time, and display the extracted average jitter.

2. The packet monitoring apparatus according to claim 1, wherein
the jitter is an absolute value of an interval difference between the capturing time interval and a transmission time interval, the transmission time interval is a time interval between the plurality of packets transmitted from the transmission apparatus.

3. The packet monitoring apparatus according to claim 2, wherein
the transmission time interval is a value obtained by dividing the interval difference by the frequency.

4. The packet monitoring apparatus according to claim 3, wherein
the transmission time interval is an average value of the capturing time intervals.

5. The packet monitoring apparatus according to claim 2, wherein
the processor is further configured to:
specify the transmission time interval based on the capturing time intervals within a period in which a value indicating a dispersion of the capturing time intervals is equal to or lower than a certain value.

6. The packet monitoring apparatus according to claim 1, wherein
the processor is further configured to:
output an alarm to a display apparatus when the specified jitter is equal to or higher than a certain value.

7. The packet monitoring apparatus according to claim 1, wherein
the plurality of packets are transmitted based on a communication protocol selectively using a first communication mode in which the clock frequency is prescribed in advance and a second communication mode in which the clock frequency is not prescribed,
the plurality of packets include first identification information for identifying the first session, and
the plurality of packets are transmitted in the second communication mode.

8. The packet monitoring apparatus according to claim 2, wherein
the processor is further configured to:
specify the transmission time interval based on the capturing time interval within a period in which a standard deviation or a variance of the capturing time intervals is equal to or lower than a certain value.

9. The packet monitoring apparatus according to claim 2, wherein
the processor is further configured to:
specify the transmission time interval based on a representative value of the capturing time intervals within a period in which a value indicating a dispersion of the capturing time intervals is equal to or lower than a certain value.

10. The packet monitoring apparatus according to claim 9, wherein
the processor is further configured to:
specify the transmission time interval using at least one of an average value, a mode value, and a median of the capturing time intervals as the representative value.

11. The packet monitoring apparatus according to claim 9, wherein
the processor is further configured to:
specify, based on the clock frequency, the jitter within a second period in which a value indicative of the dispersion of the capturing time intervals exceeds a certain value.

12. A method of monitoring packets using a packet monitoring apparatus coupled to a communication line between a transmission apparatus and a reception apparatus, the method comprising:
capturing a plurality of packets transmitted through the communication line and belonging to a first session;
specifying capturing time intervals between the plurality of packets captured by the packet monitoring apparatus based on time points at which each of the plurality of packets is captured by the packet monitoring apparatus;
acquiring, from each of the plurality of packets, a clock number of clocks generated by the transmission apparatus and counted when each of the plurality of packets is transmitted from the transmission apparatus;
specifying a difference of the clock numbers between each of the plurality of packets and a packet captured immediately prior to each of the plurality of packets;
specifying, based on a statistic of the capturing time intervals, a transmitting time interval with which each of the plurality of packets is transmitted from the transmission apparatus;
calculating a frequency of the clock by dividing the specified difference with the specified transmitting time interval based on the specified capturing time interval and the specified difference;
specifying a jitter of the capturing time intervals based on the specified capturing time interval, the calculated frequency, and the specified difference;
receiving an output instruction for instructing an output of the specified jitter from a user,
requesting designating a period of time of a display target of the specified jitter in response to the output instruction;
extracting, when the period of time is input by the user, an average jitter for each of unit time periods within the period of time; and
displaying the extracted average jitter.

13. The method according to claim 12, wherein
the jitter is an absolute value of an interval difference between the capturing time interval and a transmission time interval, the transmission time interval is a time interval between the plurality of packets transmitted from the transmission apparatus.

14. The method according to claim 13, wherein
the transmission time interval is a value obtained by dividing the interval difference by the frequency.

15. The method according to claim 14, wherein
the transmission time interval is an average value of the capturing time intervals.

16. A non-transitory computer-readable storage medium storing a program that causes an information processing apparatus to execute a process, the information processing apparatus is configured to be coupled to a communication line between a transmission apparatus and a reception apparatus, the process comprising:
- capturing a plurality of packets transmitted through the communication line and belonging to a first session;
- specifying capturing time intervals between the plurality of packets captured by the packet monitoring apparatus based on time points at which each of the plurality of packets is captured by the packet monitoring apparatus;
- acquiring, from each of the plurality of packets, a clock number of clocks generated by the transmission apparatus and counted when each of the plurality of packets is transmitted from the transmission apparatus;
- specifying a difference of the clock numbers between each of the plurality of packets and a packet captured immediately prior to each of the plurality of packets;
- specifying, based on a statistic of the capturing time intervals, a transmitting time interval with which each of the plurality of packets is transmitted from the transmission apparatus;
- calculating a frequency of the clock by dividing the specified difference with the specified transmitting time interval;
- specifying a jitter of the capturing time intervals based on the specified capturing time interval, the calculated frequency, and the specified difference;
- receiving an output instruction for instructing an output of the specified jitter from a user,
- requesting designating a period of time of a display target of the specified jitter in response to the output instruction;
- extracting, when the period of time is input by the user, an average jitter for each of unit time periods within the period of time; and
- displaying the extracted average jitter.

17. The non-transitory computer-readable storage medium according to claim 16, wherein
the jitter is an absolute value of an interval difference between the capturing time interval and a transmission time interval, the transmission time interval is a time interval between the plurality of packets transmitted from the transmission apparatus.

18. The non-transitory computer-readable storage medium according to claim 17, wherein
the transmission time interval is a value obtained by dividing the interval difference by the frequency.

19. The non-transitory computer-readable storage medium according to claim 18, wherein
the transmission time interval is an average value of the capturing time intervals.

* * * * *